United States Patent
Li et al.

(10) Patent No.: US 12,431,959 B2
(45) Date of Patent: Sep. 30, 2025

(54) DIGITAL FULL-BANDWIDTH DIRECT-FORWARDING RACON SYSTEM AND WORKING METHOD THEREOF

(71) Applicant: SHANGHAI NAVAR SCIENCE AND TECHNOLOGY CO. LTD., Shanghai (CN)

(72) Inventors: Rui Li, Shanghai (CN); Yudong Li, Shanghai (CN); Qunchao Zeng, Shanghai (CN); Chunhai Liu, Shanghai (CN); Huasong Liu, Shanghai (CN)

(73) Assignee: SHANGHAI NAVAR SCIENCE AND TECHNOLOGY CO. LTD., Shanghai (CN)

( * ) Notice: Subject to any disclaimer, the term of this patent is extended or adjusted under 35 U.S.C. 154(b) by 375 days.

(21) Appl. No.: 18/109,276

(22) Filed: Feb. 14, 2023

(65) Prior Publication Data

US 2023/0283356 A1    Sep. 7, 2023

Related U.S. Application Data

(63) Continuation of application No. PCT/CN2022/081110, filed on Mar. 16, 2022.

(30) Foreign Application Priority Data

Mar. 7, 2022    (CN) .................... 202210215094.9

(51) Int. Cl.
*H04B 7/155* (2006.01)
*H04B 1/00* (2006.01)
*H04L 15/00* (2006.01)

(52) U.S. Cl.
CPC ........... *H04B 7/155* (2013.01); *H04B 1/0096* (2013.01); *H04L 15/00* (2013.01)

(58) Field of Classification Search
CPC ... H02P 27/06; H04W 72/23; H04W 72/0446; H04W 72/0453; H04W 56/001;
(Continued)

(56) References Cited

U.S. PATENT DOCUMENTS

| 5,821,895 A | 10/1998 | Hounam et al. |
| 7,777,667 B1 | 8/2010 | Rankin et al. |

(Continued)

FOREIGN PATENT DOCUMENTS

| CN | 105629207 B | 2/2019 |
| CN | 109375180 A | 2/2019 |

(Continued)

*Primary Examiner* — Khalid W Shaheed
(74) *Attorney, Agent, or Firm* — Bayramoglu Law Offices LLC (57) ABSTRACT

A digital full-bandwidth direct-forwarding racon system and a working method adopt a direct forwarding architecture, which combines a digital broadband DRFM real-time forwarding technology and an encoding response architecture with dots replacing a line. A transmitting antenna and a receiving antenna operate independently and simultaneously, and directly and indiscriminately encode and forward all of the radar query signals in an operating frequency band, thus preserving complete waveform information while realizing a Morse encoding of the response information. The digital full bandwidth direct forwarding racon system is equivalent to a target with a special target characteristic, where when a radar signal within the operating frequency band irradiates the target, an echo signal with a specified Morse encoding modulation characteristic would be generated.

5 Claims, 4 Drawing Sheets

(58) Field of Classification Search
CPC ..... H04L 5/0007; H04L 5/0094; H04L 5/001; H04L 5/0023
See application file for complete search history.

(56) References Cited

U.S. PATENT DOCUMENTS

| | | | | |
|---|---|---|---|---|
| 9,094,265 | B1 * | 7/2015 | Sagisaka | H04L 27/14 |
| 10,129,821 | B2 * | 11/2018 | Han | H04W 36/0066 |
| 11,366,199 | B2 * | 6/2022 | Lang | G01S 7/4056 |
| 2013/0064328 | A1 * | 3/2013 | Adnani | H04B 1/06 |
| | | | | 455/313 |
| 2014/0225761 | A1 | 8/2014 | Garrec et al. | |
| 2020/0174098 | A1 * | 6/2020 | Lang | G01S 7/4008 |
| 2022/0321241 | A1 * | 10/2022 | Bennett | H01P 3/16 |

FOREIGN PATENT DOCUMENTS

| | | |
|---|---|---|
| CN | 111289952 A | 6/2020 |
| WO | 0165276 A1 | 9/2001 |
| WO | 2015198753 A1 | 12/2015 |

\* cited by examiner

| Morse encoding | Radar representation | | | | | | | | | | | | | | | | | | | Recorded setting value | |
|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | | |
| A | | | | | | | | | | | | | | | | | | | | 19'b111_0001_1111_1111_0000 | 19'h7_1ff8 |
| B | | | | | | | | | | | | | | | | | | | | 19'b111_1110_0110_0110_0110 | 19'h7_e666 |
| C | | | | | | | | | | | | | | | | | | | | 19'b111_0101_1101_0000_0000 | 19'h7_5d00 |
| D | | | | | | | | | | | | | | | | | | | | 19'b111_1110_0110_0110_0000 | 19'h7_e660 |
| E | | | | | | | | | | | | | | | | | | | | 19'b111_0000_0000_0000_0000 | 19'h7_0000 |
| F | | | | | | | | | | | | | | | | | | | | 19'b110_0110_0111_1110_0110 | 19'h6_67e6 |
| G | | | | | | | | | | | | | | | | | | | | 19'b111_1110_0111_1110_0110 | 19'h7_e7e6 |
| H | | | | | | | | | | | | | | | | | | | | 19'b110_0110_0110_0110_0000 | 19'h6_6660 |
| I | | | | | | | | | | | | | | | | | | | | 19'b111_1110_0000_0111_1110 | 19'h7_e07e |
| J | | | | | | | | | | | | | | | | | | | | 19'b101_1101_1101_1100_0000 | 19'h5_ddc0 |
| K | | | | | | | | | | | | | | | | | | | | 19'b111_1110_0110_0111_1110 | 19'h7_e67e |
| L | | | | | | | | | | | | | | | | | | | | 19'b110_0111_1110_0110_0110 | 19'h6_7e66 |
| M | | | | | | | | | | | | | | | | | | | | 19'b111_1110_0111_1110_0000 | 19'h7_e7e0 |
| N | | | | | | | | | | | | | | | | | | | | 19'b111_1111_1100_0111_0000 | 19'h7_fc70 |
| O | | | | | | | | | | | | | | | | | | | | 19'b111_0111_0111_0000_0000 | 19'h7_7700 |
| P | | | | | | | | | | | | | | | | | | | | 19'b101_1101_1101_0000_0000 | 19'h5_dd00 |
| Q | | | | | | | | | | | | | | | | | | | | 19'b111_0111_0101_1100_0000 | 19'h7_75c0 |
| R | | | | | | | | | | | | | | | | | | | | 19'b110_0111_1110_0110_0000 | 19'h6_7e60 |
| S | | | | | | | | | | | | | | | | | | | | 19'b111_0001_1100_0111_0000 | 19'h7_1c70 |
| T | | | | | | | | | | | | | | | | | | | | 19'b111_1111_1100_0000_0000 | 19'h7_fc00 |
| U | | | | | | | | | | | | | | | | | | | | 19'b110_0110_0111_1110_0000 | 19'h6_67e0 |
| V | | | | | | | | | | | | | | | | | | | | 19'b110_0110_0110_0111_1110 | 19'h6_667e |
| W | | | | | | | | | | | | | | | | | | | | 19'b110_0110_1110_0111_1110 | 19'h6_7e7e |
| X | | | | | | | | | | | | | | | | | | | | 19'b111_0101_0111_0000_0000 | 19'h7_5700 |
| Y | | | | | | | | | | | | | | | | | | | | 19'b111_0101_1101_1100_0000 | 19'h7_5dc0 |
| Z | | | | | | | | | | | | | | | | | | | | 19'b111_0111_0101_0000_0000 | 19'h7_7500 |
| 0 | | | | | | | | | | | | | | | | | | | | 19'b111_0111_0111_0111_0111 | 19'h7_7777 |
| 1 | | | | | | | | | | | | | | | | | | | | 19'b101_1101_1101_1101_1100 | 19'h5_dddc |
| 2 | | | | | | | | | | | | | | | | | | | | 19'b101_0111_0111_0111_0000 | 19'h5_7770 |
| 3 | | | | | | | | | | | | | | | | | | | | 19'b101_0101_1101_1100_0000 | 19'h5_5dc0 |
| 4 | | | | | | | | | | | | | | | | | | | | 19'b101_0101_0111_0000_0000 | 19'h5_5700 |
| 5 | | | | | | | | | | | | | | | | | | | | 19'b110_0110_0110_0110_0110 | 19'h6_6666 |
| 6 | | | | | | | | | | | | | | | | | | | | 19'b111_0101_0101_0000_0000 | 19'h7_5500 |
| 7 | | | | | | | | | | | | | | | | | | | | 19'b111_0111_0101_0100_0000 | 19'h7_7540 |
| 8 | | | | | | | | | | | | | | | | | | | | 19'b111_0111_0111_0101_0000 | 19'h7_7750 |
| 9 | | | | | | | | | | | | | | | | | | | | 19'b111_0111_0111_0111_0100 | 19'h7_7774 |
| NW | | | | | | | | | | | | | | | | | | | | 19'b111_0100_0101_1101_1100 | 19'h7_45dc |
| NE | | | | | | | | | | | | | | | | | | | | 19'b111_1110_0110_0000_0110 | 19'h7_e606 |
| SW | | | | | | | | | | | | | | | | | | | | 19'b101_0100_0101_1101_1100 | 19'h5_45dc |
| SE | | | | | | | | | | | | | | | | | | | | 19'b110_0110_0110_0000_0110 | 19'h6_6606 |

FIG. 4

DIGITAL FULL-BANDWIDTH DIRECT-FORWARDING RACON SYSTEM AND WORKING METHOD THEREOF

CROSS-REFERENCES OF THE RELATED APPLICATIONS

This application is a continuation application of International Application No. PCT/CN2022/081110 filed on Mar. 16, 2022, which is based upon and claims priority to Chinese Patent Application No. 202210215094.9 filed on Mar. 7, 2022, the entire contents of which are incorporated herein by reference.

TECHNICAL FIELD

The present invention belongs to the technical field of radio navigation, and in particular, to a digital full-bandwidth direct-forwarding racon system and a working method thereof.

BACKGROUND

Racons, or radar beacons are generally navigational aids, used to mark buoys, lighthouses, harbors, coasts, and other objects of nautical significance. When a radar interrogation signal is detected, the racon generates a Morse-encoded response signal representing a specific meaning.

Existing racons are mainly implemented in two ways: sweep frequency and frequency agility. At present, sweep frequency racons have been eliminated. The frequency-agile racons contain additional circuitry to determine the frequency of each received interrogation pulse and to rapidly tune the frequency of a reply signal to match the interrogation pulse.

Current mainstream frequency agile racons are analog system racon, whose operating principle is: to obtain a starting frequency and pulse width of a required response waveform through the detector circuit, main lobe detection circuit, and frequency measurement circuit, and to generate a narrow frequency pulse response signal through a voltage-controlled oscillator after obtaining the starting frequency. The response waveform generated by the voltage-controlled oscillator is output after passing through a gate-controlled switch, and the gating time of the gate-controlled switch is controlled by a Morse-encoded value.

Current mainstream racon systems have the following deficiencies:

1) The racon system is sensitive to a radar transmitting waveform and a signal processing system and is only applicable to a narrow band with simple modulated radar waveforms, and is unable to adapt to new system broadband with complex modulated waveforms, which limits the application of new system radars in the field of maritime radar.
(2) The antenna uses a transmitting-receiving time division multiplexing system, which cannot respond to radar interrogation during signal transmission, in addition, the processing capacity will be saturated at ports and other radar-intensive scenarios, thus losing effective response to surrounding radar interrogation signals.
(3) A frequency measurement generation method is adopted, where frequency, amplitude, and other parameters of the radar interrogation signal are measured and identified before responding, and it is easy to cause false identification when there are radars transmitting the same waveform around.

SUMMARY

To solve the problem that current racons cannot respond to new system radars with broadband and complex modulated waveforms, the present invention aims to provide a digital fully bandwidth direct-forwarding racon system and a working method thereof.

A conventional racon system adopts the frequency measurement-generation architecture, which shares the same antenna for the time division of transmission and reception. Before generating a reply signal, it is necessary to detect the parameter characteristics of an input signal and match them with existing radar parameters in a parameter library. When the input signal is determined to be a radar main lobe signal, the narrow frequency pulse response signal is generated according to the measured frequency parameters. The generated response waveform is output after passing through a gate-controlled switch, and the strobing time of the gate-controlled switch is controlled by a Morse-encoded value. Since the response waveform of conventional racons is a simple narrow band frequency pulse signal, which loses most waveform parameter information, the conventional racons cannot respond to a new system radar waveform with large bandwidth and complex modulated waveform.

To realize the response to the new system radar, the present inventive system proposes a new racon system architecture, and a corresponding new Morse encoding reading solution is proposed. The system according to the invention adopts a direct forwarding architecture, and the architecture combines a digital broadband DRFM real-time forwarding technology and an encoding response architecture with dots replacing a line. A transmitting antenna and a receiving antenna operate independently and simultaneously, and directly and indiscriminately encode and forward all the radar query signals in an operating frequency band, thus preserving complete waveform information while realizing the Morse encoding of the response information. The system according to the present invention is equivalent to a target with a special target characteristic, where when a radar signal within the operating frequency band irradiates the target, an echo signal with a specified Morse encoding modulation characteristic would be generated.

One of the cores of the system of the present invention also includes the implementation of Morse encoding modulation and a reading method of Morse code. A standard Morse code is constructed by three basic symbols: "dot", "blank" and "dash", with "dot" and "dash" being solid lines, "dot" and "blank" being equal in length, and "dash" being three times the length of "dot" or "blank". The dots and dashes of Morse code answered by conventional racons are shown on the radar as radial solid lines, and their lengths satisfy the standard Morse encoding rules. To achieve the response to the new system radar, the system of the present invention adopts a Morse encoding response architecture with dots replacing a line instead of the current Morse encoding effect, the encoding principle of the encoding architecture are: 1) a number of echo dots replace "dot" in the Morse code, where each echo dot occupies a basic symbol unit; 2) the "dash" in the Morse code is replaced by echo dots which are three times of a "dot", occupying three times of basic symbol units of "dot"; 3) the "blank" in the Morse code occupies the same number of basic symbol units as "dot"; and 4) the distance of each echo dot displayed on the radar depends on radar resolution and is no longer equal to a basic symbol unit. According to the above encoding principles, the identification of Morse code no longer depends on the absolute distance proportional relationship of "dot", "blank" and "dash", but mainly depends on the number of echo dots and the distance between starting dots. As long as the basic symbol unit is greater than the minimum resolution range unit of the radar, the received Morse code can be easily identified.

The following technical solutions are specifically adopted in the present invention:

A digital full-bandwidth direct-forwarding racon system comprises: an antenna system including a receiving antenna and a transmitting antenna, a radio-frequency transceiver module including radio-frequency receiving link and a radio-frequency transmitting link, and a baseband processing module including ADC acquisition module, an FPGA processing module and a DAC module;

Wherein the receiving antenna is configured to receive a signal transmitted by a radar within an operating frequency band range from space, and the transmitting antenna is configured to radiate a system response signal to the space;

The radio-frequency receiving link and the radio-frequency transmitting link share a local oscillator module, and the radio-frequency receiving link is configured to convert a radio-frequency signal output by the receiving antenna into an intermediate-frequency signal and output the intermediate-frequency signal to the ADC acquisition module of the baseband processing module; the radio-frequency transmitting link is configured to convert an intermediate-frequency signal output by the DAC module of the baseband processing module into a radio-frequency signal and output the radio-frequency signal to the transmitting antenna;

The ADC acquisition module converts a radio-frequency analog signal output by a radio-frequency receiver into a digital signal and sends the digital signal to an FPGA processing module; the DAC module converts a digital signal output by the FPGA processing module into an analog signal and sends the analog signal to an intermediate-frequency analog input interface of a radio-frequency transmitter; and the FPGA processing module is configured to realize orthogonal down-conversion processing of data acquired by ADC, envelope detection, Morse encoding modulation and orthogonal up-conversion processing.

Further, the Morse encoding modulation is realized through three parts: a signal delay module, an encoding switch module, and a superimposing module;

Wherein the encoding system adopts a multi-stage signal delay superimposing architecture: delayed signals of multi stages are connected and superimposed to form a delay chain. Delay values of the signal delay in each stage are the same and adjustable. Signal data is input into the signal delay module and the delayed signal data is output to the encoding switch module;

The encoding switch module is a switch array, each channel or stage of the delayed signal data corresponds to an on/off switch, and the on/off of the switch is controlled by a Morse-encoded setting value. The Morse-encoded setting value is obtained by looking up a Morse code mapping relationship table according to a Morse code symbol, and the encoding switch module outputs strobe delayed signal data to the superimposing module to participate in superimposing;

The superimposing module superimposes all the input delayed signal data into one channel of coded modulated waveform for output.

Further, the Morse code mapping relationship table maps the representation of "dot-dash-blank" corresponding to the Morse symbol to the Morse-encoded setting value; the basic principle of the mapping is that a "dot" or a "dash" is represented by 1 and a "blank" is represented by 0 between a "dot-dot", a "dot-dash", a "dash-dot" and a "dash-dash". The number of bits occupied by the "dot" and the "blank" are the same; the number of bits occupied by the "dash" is three times the number of bits occupied by the "dot" or the "blank", and they occupy the maximum length of data corresponding to the Morse-encoded setting value under the premise of a relative relationship among the "dot", the "dash" and the "blank".

Further, an operating frequency band range of the antenna system covers an entire 200 MHz bandwidth operating range of the racon, and a degree of isolation between the transmitting antenna and the receiving antenna is greater than a total system gain; an operating frequency band range of the radio-frequency receiving link and the radio-frequency transmitting link covers the entire 200 MHz bandwidth operating range of the racon. The radio-frequency receiving link and the radio-frequency transmitting link both comprise: a filter, an amplifier, and a mixer; a sampling rate configuration for the ADC acquisition module and the DAC module is required to ensure full-frequency band acquisition of a signal within the entire 200 MHz bandwidth operating range of the racon.

Further, a radome is also included, configured to protect the operating status of each module from being affected and interfered by environment.

Further, the working method thereof includes the steps of:

step S1: powering up and initializing;

step S2: receiving, by a receiving antenna, a radar transmission signal within an operating frequency band range from space;

step S3: filtering, amplifying, mixing, filtering, and amplifying, by a radio-frequency receiving link, a radio-frequency signal output by the receiving antenna, and outputting an intermediate-frequency signal;

step S4: analog-to-digital converting, by an ADC acquisition module of a baseband processing module, an intermediate-frequency analog signal output by the radio-frequency receiving link to a digital signal, and outputting the digital signal;

step S5: receiving, by an FPGA processing module of the baseband processing module, the digital signal output by the ADC acquisition module, performing DDC processing on the digital signal, and transferring the received signal to a baseband;

step S6: receiving, by a Morse-encoded modulation module in the FPGA processing module, a baseband signal output by a DDC processing module, and performing Morse-encoded modulation processing on the baseband signal;

step S7: receiving, by a DUC module in the FPGA processing module, an output of the Morse-encoded modulation module, performing up-conversion on the output, and outputting an intermediate-frequency digital signal after processing;

step S8: digital-to-analog converting, by a DAC module of the baseband processing module, the intermediate-frequency digital signal output by the DUC module of the FPGA processing module into an analog intermediate-frequency signal, and outputting the analog intermediate-frequency signal after processing;

step S9: filtering, amplifying, mixing, filtering, and amplifying, by a radio-frequency transmitting link, the intermediate-frequency analog signal output by the DAC module of the baseband processing module, and outputting a radio-frequency signal;

step S10: radiating, by a transmitting antenna, the radio-frequency signal output by the radio-frequency transmitting link to the space.

Compared with the prior technology, in the present invention, a receiving antenna and a transmitting antenna work independently and simultaneously without the need of detecting and identifying parameter characteristics of the input signal and achieve non-differential encoding and forwarding of all radar interrogation signals. The beneficial effects include:
1) Being insensitive to radar transmitting waveform and signal processing system, and capable of responding to new system radar signal with complex modulation waveform under the premise of compatible with traditional radar signal, which makes it possible to apply new technology and the new system to ship navigation radar system;
2) Capable of responding reliably to all received radar interrogation signals simultaneously, even if multiple radar interrogation signals have superimposed portions in the time domain or frequency domain;
3) Natural suppression of radar transmitting side lobes; and
4) Having smaller system delay, i.e., having higher distance accuracy.

BRIEF DESCRIPTION OF THE DRAWINGS

The present invention is described in further detail below in conjunction with the accompanying drawings and specific means of implementation.

DETAILED DESCRIPTION OF THE EMBODIMENTS

To make the features and advantages of the present patent more obvious and easy to understand, the following embodiments are given for detailed illustration.

The technical solutions of the present invention are further described below in conjunction with the accompanying drawings and embodiment.

While many specific details are outlined in the following description to facilitate a full understanding of the present invention, the present invention may also be implemented in other ways different from those described herein, and thus the scope of protection of the present invention is not limited by the specific embodiment disclosed below.

Figure 1:
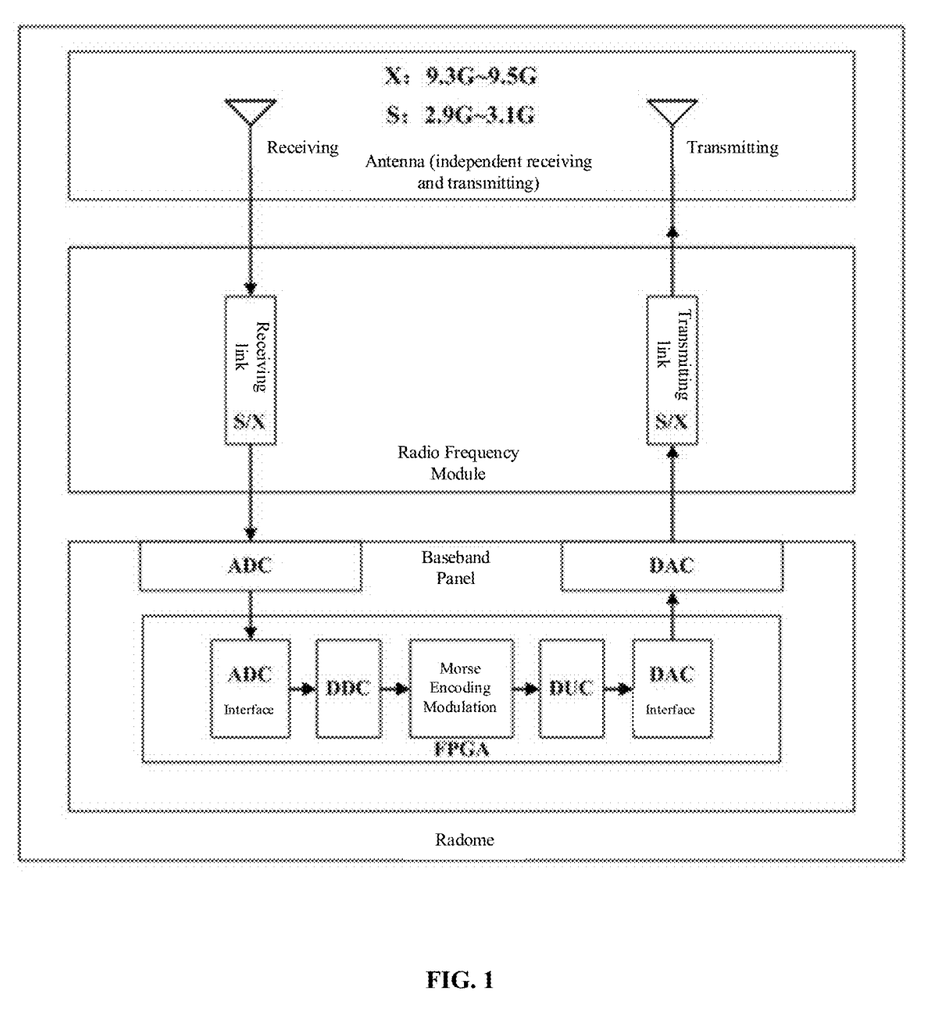
FIG. 1 is a block diagram of the composition of a system of one embodiment of the present invention.

As shown in FIG. 1, the present embodiment provides a digital full-bandwidth direct-forwarding racon system and a working method thereof, including the following components of:

(1) a receiving antenna, (2) a radio-frequency receiving link, (3) a baseband processing module, (4) a radio-frequency transmitting link, and (5) a transmitting antenna;

Where the (1) receiving antenna is configured to receive a radar transmission signal within an operating frequency band range from space;

The (2) radio-frequency receiving link is configured to filter, amplify, mix, filter, and amplify a radio-frequency signal output by the receiving antenna, and output an intermediate-frequency signal;

The (3) baseband processing module is configured to perform ADC acquisition, digital down-conversion, Morse encoding modulation, digital up-conversion, and DAC on an intermediate-frequency analog signal output by the radio-frequency receiving link;

The (4) radio-frequency transmitting link is configured to filter, amplify, mix, filter, and amplify the intermediate-frequency analog signal output by the DAC module of the baseband processing module, and output a radio-frequency signal; and The (5) the transmitting antenna is configured to radiate the radio-frequency signal output by the radio-frequency transmitting link to the space.

In the present embodiment, the connection relationship among the above components is as follows: from (1) to (5), the output of the previous module is connected to the input of the next module, in turn, thus forming the basic composition of the system.

Each component of the system of the present embodiment is described below:

Antenna system: The antenna system includes a receiving antenna and a transmitting antenna. The operating frequency band range of the antenna covers an entire 200 MHz bandwidth operating range of the racon (S-band: 2.9G~3.1G, X-band: 9.3G~9.5G). The receiving antenna is configured to receive a signal transmitted by a radar within an operating frequency band range from space, and the transmitting antenna is configured to radiate a system response signal to the space. Since the transmitting antenna and the receiving antenna need to operate simultaneously, to avoid system self-excitation, the isolation between the transmitting antenna and the receiving antenna must be greater than the total system gain. The system gain is proportional to the response distance. To increase the response distance, the design of high isolation between the transmitting antenna and the receiving antenna is essential for the present system. The two feasible ways of high isolation antenna design are: 1) to optimize the design of parameters and layout of the transmitting antenna and the receiving antenna, 2) to increase the pair of elimination branches, and the above two ways can be combined. One of the transmitting antenna and the receiving antenna needs to be placed above the other, both of which are basically vertical, and the farther apart, the better. To be compact, a radio signal isolation plate can be added between the transmitting antenna and the receiving antenna in the structural design. The isolation plate is made of metal and other materials that have isolation or shielding effects on radio signals. The transmitting antenna and the receiving antenna are placed about in a vertical line or slightly staggered. The isolation plate is generally circular, square, etc. The center of the isolation plate is about on the connecting line of the two antennas and close to the middle position between the two antennas, presenting an approximately horizontal state and being perpendicular to the antenna to avoid the system self-excitation, so that the transmission power can be increased to increase the response distance.

Radio-frequency transceiver module: The radio-frequency transceiver module includes a radio-frequency receiving link and a radio-frequency transmitting link. The operating frequency band range of the radio-frequency receiving link and the radio-frequency transmitting link cover an entire 200 MHz bandwidth operating range of the racon (S-band: 2.9G~3.1G, X-band: 9.3G~9.5G). The radio-frequency receiving link and the radio-frequency transmitting link include core devices such as filters, amplifiers, mixers, etc. The radio-frequency receiving link and the radio-frequency transmitting link share the same local oscillator module. The radio-frequency receiving link is configured to convert a radio-frequency signal output by the receiving antenna into an intermediate-frequency signal and output the intermediate-frequency signal to the ADC acquisition module of the baseband processing module, and the radio-frequency transmitting link is configured to convert an intermediate-frequency signal output by the DAC module of the baseband processing module into a radio-frequency signal and output the radio-frequency signal to the transmitting antenna.

Baseband processing module: The baseband processing module mainly includes an ADC acquisition module, an FPGA processing module, and a DAC module. The ADC acquisition module analog-to-digital converts an intermediate-frequency analog signal output by a radio-frequency receiver to a digital signal and outputs the digital signal to the FPGA processing module. The DAC module converts the digital signal output by the FPGA processing module into an analog signal and transmits the analog signal to an intermediate-frequency analog input interface of a radio-frequency transmitter. The sampling rate configuration for the ADC acquisition module and the DAC module is required to ensure full-frequency band acquisition of a signal within the entire 200 MHz bandwidth operating range of the racon. The FPGA processing module is the core module of the system of the present invention, which mainly realizes orthogonal down-conversion processing of data acquired by ADC, envelope detection, Morse encoding modulation, and orthogonal up-conversion processing.

Figure 2:
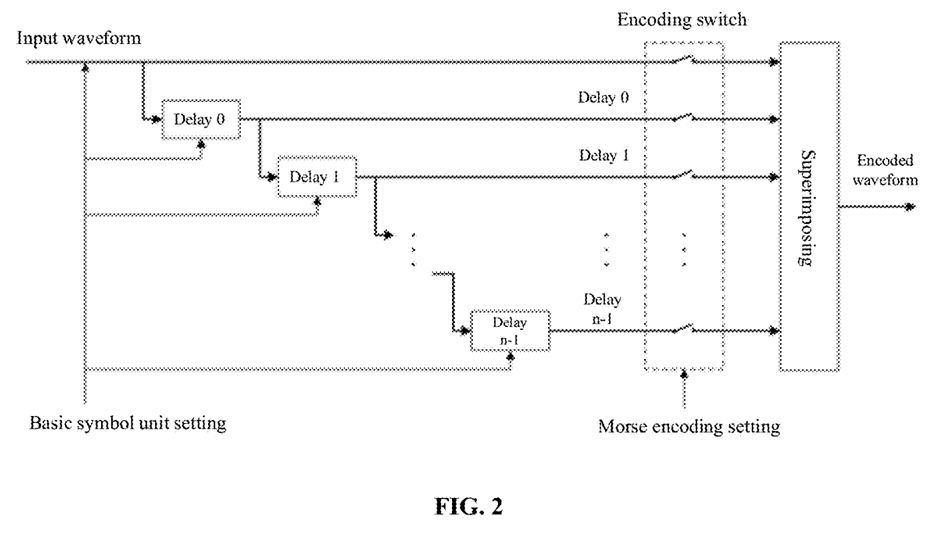
FIG. 2 is a block diagram of the implementation of a Morse-encoded modulation module of an embodiment of the present invention.
Figure 3:
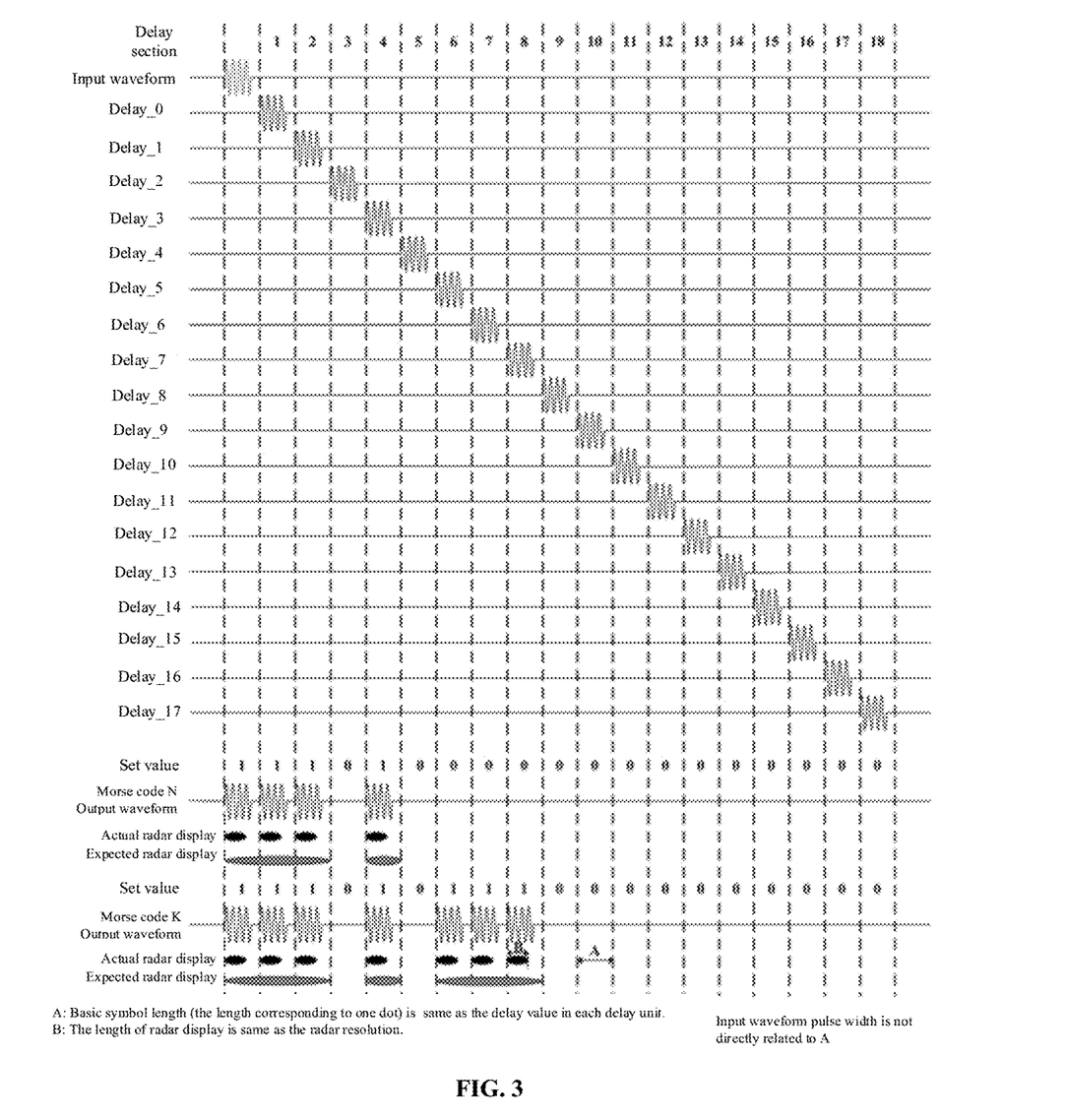
FIG. 3 is a schematic diagram of the principle of a Morse-encoded modulation module of an embodiment of the present invention.
Figure 4:
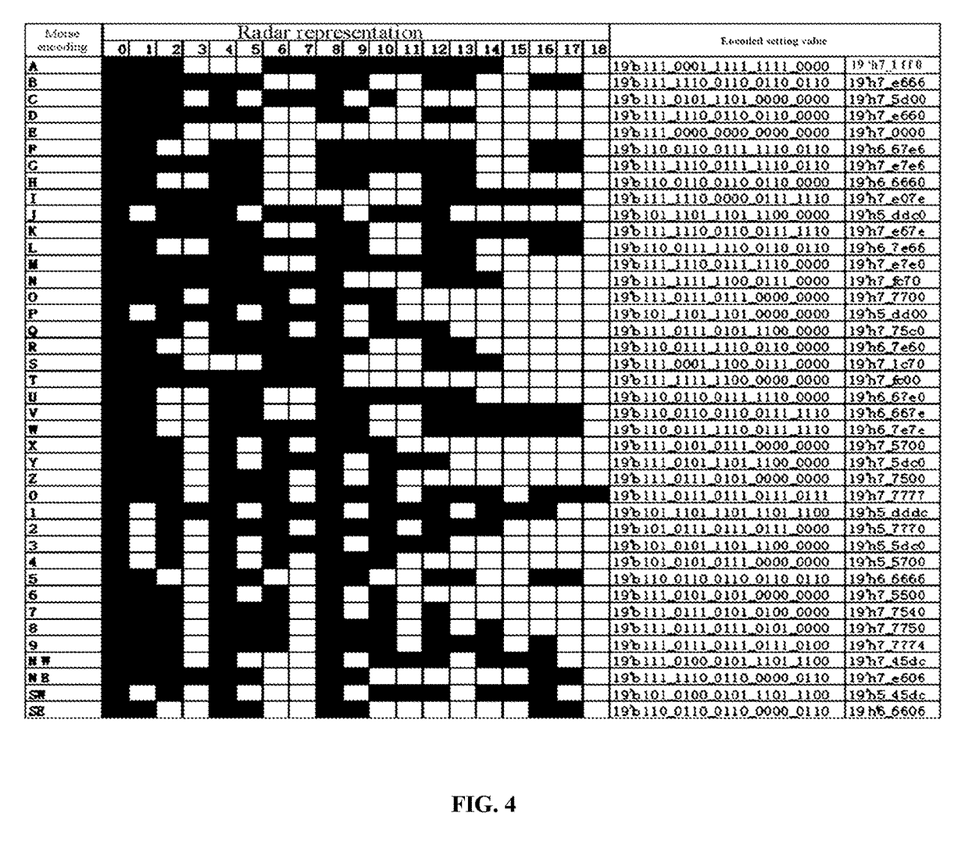
FIG. 4 is a mapping relationship table of Morse code of an embodiment of the present invention.

As shown in FIGS. 2 to 4, the Morse encoding system is one of the core processing aspects of the system of the present embodiment, including three parts: a signal delay module, an encoding switch module, and a superimposing module. The encoding system adopts a multi-stage signal delay data superimposing architecture, and delayed signals of multi stages are connected and superimposed to form a delay chain. Delay values of the signal delay in each stage are the same and configurable; each stage of the signal delay can be divided into a multi-level sub delays to optimize the display effect. The signal data (signal length is long enough for radars to recognize) is input into the signal delay module and signal delay data is output to the encoding switch module. The encoding switch module is a switch array, where each channel or stage of the signal delay data corresponds to an on/off switch, and the on/off of the switch is controlled by a Morse-encoded setting value. The Morse-encoded setting value is obtained by looking up a Morse code mapping relationship table compiled by the present invention according to a Morse code symbol. The Morse code mapping relationship is a correspondence table where the Morse code symbol corresponds to the Morse-encoded setting value. The Morse code symbol includes A to Z, 0 to 9, NW, NE, SW, SE. The number of bits of the Morse-encoded setting value and the number of channels of signal delay are the same, arranged from high to low in order. Each one bit of the Morse-encoded setting value is referred to as a basic symbol unit, and each one bit of the Morse-encoded setting value controls an on/off switch in the encoding switch module. The function of the Morse code mapping relationship table is to map the representation of "dot-dash-blank" corresponding to the Morse symbol to the Morse-encoded setting value. The basic principle of the mapping is that a "dot" or a "dash" is represented by 1 and a "blank" is represented by 0 between a "dot-dot", a "dot-dash", a "dash-dot" and a "dash-dash"; the number of bits occupied by the "dot" and the "blank" is the same, the number of bits occupied by the "dash" is three times the number of bits occupied by the "dot" or the "blank", and they occupy the maximum length of data corresponding to the Morse-encoded setting value under the premise of a relative relationship among the "dot", the "dash" and the "blank". The encoding switch module outputs strobe signal delay data to the superimposing module to participate in superimposing, and the superimposing module superimposes all the input delayed signal data into one channel of coded modulated waveform for output.

Radome: Radome is configured to protect other components of the system of the present invention and prevent the environment from affecting and interfering operating statuses of other components. Besides, the design of the radome has a certain influence on the isolation of the transmitting antenna and the receiving antenna of the system of the present invention. Thus the design of the radome and the design of the transmitting antenna and the receiving antenna should be considered comprehensively.

Based on the above system and the principles involved, as a preference, the present embodiment provides a more specific design and working method under the system architecture:

1) Powering up and initializing the system;
2) Transmitting a Morse-encoded setting value: 19'b111_1111_1100_0111_0000 (Morse code: N) and a delay value of the signal delay: 500 (corresponding to the length of the basic symbol unit: 500*4 ns=2 us) to the Morse-encoded modulation module of the baseband processing module;
3) Receiving, by the receiving antenna (X: 9.3~9.5G, omnidirectional, horizontally polarized, pitch angle: 22°, gain: 6 dBi, the isolation between the transmitting antenna and the receiving antenna: 85 dB), a radar transmission signal within an operating frequency band range from space;
4) Filtering, amplifying, mixing, filtering, and amplifying, by the radio-frequency receiving link (input: 9.3~9.5 GHz, output: 600~800 MHz, gain: 30 dB), a radio-frequency signal output by the receiving antenna, and outputting an intermediate-frequency signal;
5) Analog-to-digital converting, by an ADC acquisition module of a baseband processing module (sampling rate 1 Gbps), an intermediate-frequency analog signal output by the radio-frequency receiving link to a digital signal (4 parallel channels @250 MHz), and outputting the digital signal;
6) Receiving, by an FPGA processing module of the baseband processing module (FPGA model: xc7v325t-ffg900), the digital signal output by the ADC acquisition module, performing DDC processing on the digital signal (local oscillator frequency: 700 MHz, filter bandwidth: 200 MHz, 4 taps), and transferring the received signal to a baseband (1 channel signal with a sampling rate of 250 Mbps);
7) Receiving, by the Morse-encoded modulation module in the FPGA processing module, a baseband signal output by a DDC processing module, and performing Morse-encoded modulation processing on the baseband signal;

8) Receiving, by a DUC module in the FPGA processing module (local oscillator frequency: 700 MHz, filter bandwidth: 200 MHz, interpolation(s): 4), an output of the Morse-encoded modulation module, performing up-conversion on the output, and outputting an intermediate-frequency digital signal (4 parallel channels @250 MHz) after processing;

9) Digital-to-analog converting, by a DAC module of the baseband processing module, the intermediate-frequency digital signal output by the DUC module of the FPGA processing module into an analog intermediate-frequency signal, and outputting the analog intermediate-frequency signal after processing (1 channel with 600~800 MHz);

10) Filtering, amplifying, mixing, filtering, and amplifying, by a radio-frequency transmitting link (input: 600~800 MHz, output: 9.3~9.5 GHz, and gain: 50 dB), the intermediate-frequency analog signal output by the DAC module of the baseband processing module, and outputting a radio-frequency signal;

11) Radiating, by a transmitting antenna (X: 9.3~9.5G, omnidirectional, horizontally polarized, with pitch angle of 22°, gain of 6 dBi, the isolation between the transmitting antenna and the receiving antenna of 85 dB), the radio-frequency signal output by the radio-frequency transmitting link to the space.

The above is only a preferred embodiment of the present invention, not a limitation to the present invention in other forms. Any technical personnel familiar with the profession may use the disclosed technical content to change or modify the above embodiment into an equivalent embodiment with equivalent changes. However, any simple modification, equivalent change, and variation of the above embodiment according to the technical essence of the present invention without departing from the content of the technical solution of the present invention still belong to the protection scope of the technical solution of the present invention.

Apparently, the above embodiment of the present invention are only examples for the purpose of clearly illustrating the present invention and are not limitations to the embodiment of the present invention. A person of ordinary skill in the art may further make other changes or variations in a different form based on the above description. Herein, examples are unnecessarily provided for all implementation manners. Any modification, equivalent replacement, improvement, and the like made within the spirit and principle of the present invention should be included in the scope of protection of the claims of the present invention.

What is claimed is:

1. A digital full-bandwidth direct-forwarding racon system, comprising:
   an antenna system including a receiving antenna and a transmitting antenna;
   a radio-frequency transceiver module including a radio-frequency receiving link and a radio-frequency transmitting link; and
   a baseband processing module including an analog-to-digital converter (ADC) acquisition module, a field programmable gate array (FPGA) processing module, and a digital-to-analog converter (DAC) module;
   wherein the receiving antenna is configured to receive a signal transmitted by a radar within an operating frequency band range from space, and the transmitting antenna is configured to radiate a system response signal to the space;
   the radio-frequency receiving link and the radio-frequency transmitting link share a local oscillator module, and the radio-frequency receiving link is configured to convert a radio-frequency signal output by the receiving antenna into an intermediate-frequency signal and output the intermediate-frequency signal to the ADC acquisition module of the baseband processing module; the radio-frequency transmitting link is configured to convert an intermediate-frequency signal output by the DAC module of the baseband processing module into a radio-frequency signal and output the radio-frequency signal to the transmitting antenna; and
   the ADC acquisition module converts an intermediate-frequency analog signal output by a radio-frequency receiver into a digital signal and sends the digital signal to a FPGA processing module; the DAC module converts a digital signal output by the FPGA processing module into an analog signal and sends the analog signal to an intermediate-frequency analog input interface of a radio-frequency transmitter; and the FPGA processing module is configured to realize orthogonal down-conversion processing of data acquired by ADC, envelope detection, Morse encoding modulation and orthogonal up-conversion processing;
   wherein the Morse encoding modulation is realized through three parts: a signal delay module, an encoding switch module, and a superimposing module;
   wherein the encoding system adopts a multi-stage delayed signal superimposing architecture, and delayed signals are connected and superimposed to form a delay chain; delay values of the signal delay in each stage are the same and adjustable; and the signal data is input into the signal delay module and signal delay data is output to the encoding switch module; and
   the encoding switch module is a switch array, each channel or stage of the signal delay data corresponds to an on/off switch, and the on/off of the switch is controlled by a Morse-encoded setting value; the Morse-encoded setting value is obtained by looking up a Morse code mapping relationship table according to a Morse code symbol; and the encoding switch module outputs strobe signal delay data to the superimposing module to participate in superimposing; and the superimposing module superimposes all the input delayed signals into one channel of coded modulated waveform for output.

2. The digital full-bandwidth direct-forwarding racon system according to claim 1, wherein the Morse code mapping relationship table maps the representation of "dot-dash-blank" corresponding to the Morse symbol to the Morse-encoded setting value; the basic principle of the mapping is that a "dot" or a "dash" is represented by 1 and a "blank" is represented by 0 between a "dot-dot", a "dot-dash", a "dash-dot" and a "dash-dash"; the number of bits occupied by the "dot" and the "blank" are the same; the number of bits occupied by the "dash" is three times the number of bits occupied by the "dot" or the "blank", and they occupy the maximum length of data corresponding to the Morse-encoded setting value under the premise of a relative relationship among the "dot", the "dash" and the "blank".

3. The digital full-bandwidth direct-forwarding racon system according to claim 1, wherein an operating frequency band range of the antenna system covers an entire 200 MHz bandwidth operating range of the racon, and a degree of isolation between the transmitting antenna and the receiving antenna is greater than a total system gain; an operating frequency band range of the radio-frequency receiving link and the radio-frequency transmitting link covers the entire 200 MHz bandwidth operating range of the racon; the radio-frequency receiving link and the radio-frequency transmitting link both comprise: a filter, an amplifier, and a mixer; the sampling rate configuration for the ADC acquisition module and the DAC module is required to ensure full-frequency band acquisition of a signal within the entire 200 MHz bandwidth operating range of the racon.

4. The digital full-bandwidth direct-forwarding racon system according to claim 1, further comprising: a radome configured to protect an operating status of each module from being affected and interfered by environment.

5. A operating method of the digital full-bandwidth direct-forwarding racon system according to claim 2, comprising the steps of:
- (step S1) powering up and initializing;
- (step S2) receiving, by a receiving antenna, a radar transmission signal within an operating frequency band range from space;
- (step S3) filtering, amplifying, mixing, filtering, and amplifying, by a radio-frequency receiving link, a radio-frequency signal output by the receiving antenna, and outputting an intermediate-frequency signal;
- (step S4) analog-to-digital converting, by an ADC acquisition module of a baseband processing module, an intermediate-frequency analog signal output by the radio-frequency receiving link to a digital signal, and outputting the digital signal;
- (step S5) receiving, by an FPGA processing module of the baseband processing module, the digital signal output by the ADC acquisition module, performing DDC processing on the digital signal, and transferring the received signal to a baseband; 4
- (step S6) receiving, by a Morse-encoded modulation module in the FPGA processing module, a baseband signal output by a DDC processing module, and performing Morse-encoded modulation processing on the baseband signal;
- (step S7) receiving, by a DUC module in the FPGA processing module, an output of the Morse-encoded modulation module, performing up-conversion on the output, and outputting an intermediate-frequency digital signal after processing;
- (step S8) digital-to-analog converting, by a DAC module of the baseband processing module, the intermediate-frequency digital signal output by the DUC module of the FPGA processing module into an analog intermediate-frequency signal, and outputting the analog intermediate-frequency signal after processing;
- (step S9) filtering, amplifying, mixing, filtering, and amplifying, by a radio-frequency transmitting link, the intermediate-frequency analog signal output by the DAC module of the baseband processing module, and outputting a radio-frequency signal; and
- (step S10) radiating, by a transmitting antenna, the radio-frequency signal output by the radio-frequency transmitting link to the space.

\* \* \* \* \*